United States Patent
Lin

(10) Patent No.: US 10,994,743 B2
(45) Date of Patent: May 4, 2021

(54) CONTROL METHOD AND SYSTEM FOR VEHICLE

(71) Applicant: HUAWEI TECHNOLOGIES CO., LTD., Guangdong (CN)

(72) Inventor: Yangbo Lin, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 259 days.

(21) Appl. No.: 16/170,793

(22) Filed: Oct. 25, 2018

(65) Prior Publication Data

US 2019/0061777 A1    Feb. 28, 2019

Related U.S. Application Data

(63) Continuation of application No. PCT/CN2016/105316, filed on Nov. 10, 2016.

(30) Foreign Application Priority Data

Apr. 27, 2016    (CN) .......................... 201610270320.8

(51) Int. Cl.
   *B60W 50/08* (2020.01)
   *G05B 19/04* (2006.01)
   (Continued)

(52) U.S. Cl.
   CPC ........ *B60W 50/08* (2013.01); *B60W 50/0205* (2013.01); *B60W 50/035* (2013.01);
   (Continued)

(58) Field of Classification Search
   CPC ..................................... B60W 50/08
   See application file for complete search history.

(56) References Cited

U.S. PATENT DOCUMENTS

8,606,455 B2 * 12/2013 Boehringer ............ G08G 1/167
                                                          701/23
9,150,200 B2 * 10/2015 Urhahne .............. B60K 28/066
   (Continued)

FOREIGN PATENT DOCUMENTS

CN    103693038 A    4/2014
CN    104064050 A    9/2014
   (Continued)

OTHER PUBLICATIONS

Machine Translation and Abstract of Japanese Publication No. JP2008189139, Aug. 21, 2008, 19 pages.
   (Continued)

*Primary Examiner* — Michael A Berns
(74) *Attorney, Agent, or Firm* — Conley Rose, P.C.

(57) ABSTRACT

A control method for a vehicle is disclosed. The vehicle includes an in-vehicle controller, the in-vehicle controller pre-stores an instruction relationship, and the instruction relationship is used to represent an execution selection that is made by the in-vehicle controller from contrary instructions of at least two controllers. The method includes: receiving, by the in-vehicle controller, a first instruction and a second instruction (S410); and determining, by the in-vehicle controller, a vehicle control instruction according to the instruction relationship, the first instruction, and the second instruction (S420).

20 Claims, 5 Drawing Sheets

(51) Int. Cl.

| | | |
|---|---|---|
| *G05D 1/00* | (2006.01) | |
| *B60W 50/02* | (2012.01) | |
| *B60W 50/035* | (2012.01) | |
| *B60W 30/06* | (2006.01) | |
| *B60W 50/00* | (2006.01) | |

(52) U.S. Cl.
CPC .......... *G05B 19/04* (2013.01); *G05D 1/0061* (2013.01); *G05D 1/0088* (2013.01); *B60W 30/06* (2013.01); *B60W 2050/009* (2013.01); *B60W 2050/0014* (2013.01); *G05B 2219/2603* (2013.01); *G05D 2201/0213* (2013.01)

(56) References Cited

U.S. PATENT DOCUMENTS

| | | | | |
|---|---|---|---|---|
| 9,298,184 | B2* | 3/2016 | Bartels | B60W 50/14 |
| 10,046,793 | B2* | 8/2018 | Green | B62D 15/025 |
| 10,173,693 | B2* | 1/2019 | Barke | B60W 40/09 |
| 10,491,409 | B2* | 11/2019 | Lee | H04L 12/1492 |
| 2012/0143417 | A1* | 6/2012 | Chung | B60W 20/50 701/22 |
| 2012/0277947 | A1 | 11/2012 | Boehringer et al. | |
| 2014/0277896 | A1 | 9/2014 | Lathrop et al. | |
| 2014/0297060 | A1* | 10/2014 | Schmidt | B60W 50/10 701/1 |
| 2014/0297115 | A1 | 10/2014 | Kang et al. | |
| 2014/0365062 | A1 | 12/2014 | Urhahne | |
| 2015/0120124 | A1 | 4/2015 | Bartels et al. | |
| 2015/0191178 | A1 | 7/2015 | Roy et al. | |
| 2015/0239500 | A1 | 8/2015 | Green et al. | |
| 2015/0253778 | A1 | 9/2015 | Rothoff et al. | |
| 2016/0288801 | A1 | 10/2016 | Chen | |

FOREIGN PATENT DOCUMENTS

| | | |
|---|---|---|
| CN | 104079669 A | 10/2014 |
| CN | 104097634 A | 10/2014 |
| CN | 104477167 A | 4/2015 |
| CN | 104765598 A | 7/2015 |
| CN | 104859652 A | 8/2015 |
| CN | 104890595 A | 9/2015 |
| CN | 205038515 U | 2/2016 |
| CN | 105365851 A | 3/2016 |
| JP | 2000113384 A | 4/2000 |
| JP | 2008189139 A | 8/2008 |
| JP | 2009274594 A | 11/2009 |
| JP | 2014217075 A | 11/2014 |
| JP | 2015033942 A | 2/2015 |

OTHER PUBLICATIONS

Machine Translation and Abstract of Japanese Publication No. JP2000113384, Apr. 21, 2000, 36 pages.
Machine Translation and Abstract of Japanese Publication No. JP2009274594, Nov. 26, 2009, 35 pages.
Machine Translation and Abstract of Japanese Publication No. JP2015033942, Feb. 19, 2015, 25 pages.
Foreign Communication From A Counterpart Application, Chinese Application No. 2018-546832, Chinese Office Action dated Oct. 1, 2019, 5 pages.
Foreign Communication From A Counterpart Application, Chinese Application No. 2018-546832, English Translation of Chinese Office Action dated Oct. 1, 2019, 6 pages.
Chinese Office Action dated Mar. 4, 2019 in corresponding Chinese Patent Application No. 10-84195899 (6 pages).
Extended European Search Report, dated Jan. 17, 2019, in European Application No. 16900220.1 (10 pp.).
International Search Report, dated Feb. 6, 2017, in International Application No. PCT/CN2016/105316 (9 pp.).

\* cited by examiner

CONTROL METHOD AND SYSTEM FOR VEHICLE

CROSS-REFERENCE TO RELATED APPLICATIONS

This application is a continuation of International Application No. PCT/CN2016/105316, filed on Nov. 10, 2016, which claims priority to Chinese Patent Application No. 201610270320.8, filed on Apr. 27, 2016. The disclosures of the aforementioned applications are hereby incorporated by reference in their entireties.

TECHNICAL FIELD

The present application relates to the field of vehicle control technologies, and in particular, to a control method and system for a vehicle.

BACKGROUND

An ITS (Intelligent Transportation System) is a real-time, accurate, efficient comprehensive transportation management system that can function in all aspects over a wide area, and is established by effectively integrating advanced information technologies, data communication transmission technologies, electronic sensing technologies, control technologies, computer technologies, and the like together and applying them to an entire ground transportation-associated system.

Automated driving is an important part of the ITS. Automated driving can effectively make up for deficiencies of human drivers in judgments, reactions, and operations, to help improve transportation security. During automated driving, information and resources provided by a transportation system can be better utilized, to help improve transportation efficiency. An automatically driven vehicle is referred to as an automated vehicle.

The technical development and market introduction of automated driving are implemented at different stages. Initially, automated driving starts from a DAS (Driver Assistance System) that provides information and alerts to human drivers, and then gradually transits to an ADS (Automated Driving System) that can take over a growing quantity of dynamic driving tasks from human drivers. Finally, complete automatic vehicle control is implemented without intervention of human drivers.

Intelligence development of vehicles and enhancement of transportation systems need to take a relatively long period of time. In this period, human drivers are indispensable to processing of some special, complex, or unpredictable cases. In addition, for some particular scenarios or requirements, for example, when a failure occurs on a vehicle or the ITS or when security detection or functional verification is performed, a human driver may be needed to control the vehicle.

It can be learned that, in different scenarios, vehicle control may be performed by non-human drivers (such as, the ITS and the ADS), human drivers, or a combination thereof, and these complex and variable cases have important impact on vehicle control. To satisfy flexibility of vehicle control, ensure security of the ITS, and adapt to development of vehicle intelligence and Internet of vehicles, how to effectively coordinate vehicle control behaviors of non-human drivers and human drivers becomes an urgent problem to be resolved.

SUMMARY

Embodiments of the present application provide a control method and system for a vehicle, to effectively coordinate vehicle control behaviors of a non-human driver or a human driver.

To resolve the foregoing technical problem, the embodiments of the present application disclose the following technical solutions.

According to a first aspect, an embodiment of the present application discloses a control method for a vehicle. The vehicle includes an in-vehicle controller, the in-vehicle controller pre-stores an instruction relationship, and the instruction relationship is used to represent an execution selection that is made by the in-vehicle controller from contrary instructions of at least two controllers. The method includes: receiving, by the in-vehicle controller, a first instruction and a second instruction; and determining, by the in-vehicle controller, a vehicle control instruction according to the instruction relationship, the first instruction, and the second instruction.

In a first feasible implementation, the determining, by the in-vehicle controller, a vehicle control instruction according to the instruction relationship, the first instruction, and the second instruction includes: when the first instruction and the second instruction are contrary, determining, by the in-vehicle controller, the vehicle control instruction according to the execution selection that is made from the first instruction and the second instruction based on the instruction relationship.

In a second feasible implementation, the determining, by the in-vehicle controller, a vehicle control instruction according to the instruction relationship, the first instruction, and the second instruction includes: when the first instruction and the second instruction are not contrary, determining, by the in-vehicle controller, that the first instruction and the second instruction are both vehicle control instructions.

This embodiment of the present application has the following beneficial effects: When instructions conflicting with each other that are sent from different controllers are received, it is determined, according to the instruction relationship pre-stored in the in-vehicle controller, which instruction is to be executed, so as to coordinate vehicle control behaviors of an ITS, an ADS, and a human driver, thereby ensuring security of a control system for a vehicle.

In a third feasible implementation, the method further includes: adjusting, by the in-vehicle controller, the instruction relationship according to a vehicle parameter of the vehicle.

In a fourth feasible implementation, the vehicle parameter includes at least one of a driving mode of the vehicle, a running status of the vehicle, a maintenance status of the vehicle, or performance of the vehicle.

This embodiment of the present application has the following beneficial effect: A priority relationship of controlling the vehicle by the controllers is adjusted according to the vehicle parameter, so that an optimal vehicle controller can be selected according to an actual situation or an actual need, to perform vehicle control.

In a fifth feasible implementation, the determining, by the in-vehicle controller, a vehicle control instruction according to the instruction relationship, the first instruction, and the second instruction further includes: when the vehicle control instruction satisfies a preset condition, ignoring, by the in-vehicle controller, the vehicle control instruction, where the preset condition includes at least one of a speed limit, a direction limit, a distance limit, or an instruction limit of the vehicle.

In a sixth feasible implementation, after the ignoring, by the in-vehicle controller, the vehicle control instruction, the method further includes: outputting, by the in-vehicle controller, warning information, where the warning information is used to warn at least one of a controller that sends the first instruction or a controller that sends the second instruction.

In a seventh feasible implementation, the determining, by the in-vehicle controller, a vehicle control instruction according to the instruction relationship, the first instruction, and the second instruction further includes: when the vehicle cannot execute the first instruction, determining, by the in-vehicle controller, the second instruction as the vehicle control instruction; or when the vehicle can execute neither the first instruction nor the second instruction, performing, by the in-vehicle controller, emergency handling, where the emergency handling includes at least one of parking, starting, speed changing, or direction changing.

This embodiment of the present application has the following beneficial effects: If it is determined that the vehicle control instruction satisfies the preset condition, the vehicle control instruction is ignored, to avoid a danger caused by execution of the vehicle control instruction to the vehicle, thereby improving the security of the control system for a vehicle.

In an eighth feasible implementation, any one of the at least two controllers includes: a human driver, an automated driving system, or an intelligent transportation system.

According to a second aspect, an embodiment of the present application discloses a control method for a vehicle. The vehicle includes an in-vehicle controller and an execution unit. The method includes: receiving, by the in-vehicle controller, a vehicle control instruction, and determining a function level to which a control function corresponding to the vehicle control instruction belongs; determining, by the in-vehicle controller, according to the function level to which the control function corresponding to the vehicle control instruction belongs and an instruction sending controller that sends the vehicle control instruction, whether the vehicle control instruction is valid; and if the vehicle control instruction is valid, instructing, by the in-vehicle controller, the execution unit to execute the vehicle control instruction; or if the vehicle control instruction is invalid, ignoring, by the in-vehicle controller, the vehicle control instruction.

In a first feasible implementation, the function level to which the control function corresponding to the vehicle control instruction belongs is obtained through classification according to impact of the control function corresponding to the vehicle control instruction on security of a vehicle system and flexibility of customizing the control function.

In a second feasible implementation, the function level to which the control function corresponding to the vehicle control instruction belongs includes: a negotiation level, a control level, and a limited level; and the determining, by the in-vehicle controller, according to the function level to which the control function corresponding to the vehicle control instruction belongs and an instruction sending controller that sends the vehicle control instruction, whether the vehicle control instruction is valid includes: if the control function corresponding to the vehicle control instruction belongs to the limited level, determining that the vehicle control instruction is invalid; or if the control function corresponding to the vehicle control instruction belongs to the control level, comparing a priority of the instruction sending controller with a priority of a current vehicle controller, and if the priority of the instruction sending controller is higher than or equal to the priority of the current vehicle controller, determining that the vehicle control instruction is valid, or if the priority of the instruction sending controller is lower than the priority of the current vehicle controller, determining that the vehicle control instruction is invalid; or if the control function corresponding to the vehicle control instruction belongs to the negotiation level, comparing a priority of the instruction sending controller with a priority of a current vehicle controller, and if the priority of the instruction sending controller is higher than or equal to the priority of the current vehicle controller, determining that the vehicle control instruction is valid and is used as a primary control instruction, so that the in-vehicle controller controls the vehicle according to the primary control instruction with reference to another secondary control instruction, or if the priority of the instruction sending controller is lower than the priority of the current vehicle controller, determining that the vehicle control instruction is valid and is used as a secondary control instruction, so that the in-vehicle controller controls the vehicle according to a primary control instruction with reference to the secondary control instruction.

This embodiment of the present application has the following beneficial effects: Vehicle control functions are classified in advance into different function levels. After receiving the vehicle control instruction, the in-vehicle controller determines the function level to which the vehicle control instruction belongs, and then determines, according to the function level corresponding to the vehicle control instruction and the instruction sending controller, whether the vehicle control instruction is valid. If the vehicle control instruction is valid, the in-vehicle controller instructs the execution unit to execute the vehicle control instruction; or if the vehicle control instruction is invalid, the in-vehicle controller instructs the execution unit to ignore the vehicle control instruction. In the control method for a vehicle, the in-vehicle controller does not simply determine that the vehicle control instruction that is sent by the current vehicle controller corresponding to a current driving mode of the vehicle is valid. Instead, the in-vehicle controller determines, with reference to the function level to which the control function corresponding to the vehicle control instruction belongs and the instruction sending controller, whether the vehicle control instruction is valid, so as to coordinate vehicle control behaviors of an ITS, an ADS, and a human driver, thereby satisfying flexibility of vehicle control, that is, all vehicle controllers are possible to control the vehicle regardless of the current driving mode of the vehicle, and ensuring security of a control system for a vehicle.

In a third feasible implementation, the method further includes: when the current vehicle controller cannot control the vehicle, requesting, by the in-vehicle controller according to priorities, another vehicle controller to participate in vehicle control; when determining that the another vehicle controller can participate in vehicle control, determining, by the in-vehicle controller, that a vehicle control instruction sent by the another vehicle controller is valid; and when determining that no other vehicle controllers can participate in vehicle control, performing, by the in-vehicle controller, emergency handling.

In a fourth feasible implementation, the method further includes: if execution of the vehicle control instruction causes the vehicle to be in danger, determining, by the in-vehicle controller, that the vehicle control instruction is invalid.

In a fifth feasible implementation, the method further includes: if the vehicle control instruction is invalid, outputting, by the in-vehicle controller, warning information, where the warning information is used to warn the instruction sending controller.

This embodiment of the present application has the following beneficial effects: When the current vehicle controller cannot control the vehicle due to a failure, the in-vehicle controller requests, in descending order of the priorities, the another vehicle controller to intervene in vehicle control. If the another vehicle controller can take over vehicle control, the driving mode of the vehicle is switched, so that the another vehicle controller controls the vehicle. If the another vehicle controller cannot take over the vehicle control, a security measure is taken for emergency handling, to fully ensure the security of the control system for a vehicle.

In a sixth feasible implementation, both the current vehicle controller and the instruction sending controller include: a human driver, an automated driving system, or an intelligent transportation system.

According to a third aspect, an embodiment of the present application discloses a control system for a vehicle, including a receiver and an in-vehicle controller. The in-vehicle controller pre-stores an instruction relationship, and the instruction relationship is used to represent an execution selection that is made by the in-vehicle controller from contrary instructions of at least two controllers. The receiver is configured to receive a first instruction and a second instruction. The in-vehicle controller is configured to determine a vehicle control instruction according to the instruction relationship, the first instruction, and the second instruction.

In a first feasible implementation, the in-vehicle controller is specifically configured to: when the first instruction and the second instruction are contrary, determine the vehicle control instruction according to the execution selection that is made from the first instruction and the second instruction based on the instruction relationship.

In a second feasible implementation, the in-vehicle controller is specifically configured to: when the first instruction and the second instruction are not contrary, determine that the first instruction and the second instruction are both vehicle control instructions.

In a third feasible implementation, the in-vehicle controller is further configured to adjust the instruction relationship according to a vehicle parameter of the vehicle.

In a fourth feasible implementation, the vehicle parameter includes at least one of a driving mode of the vehicle, a running status of the vehicle, a maintenance status of the vehicle, or performance of the vehicle.

In a fifth feasible implementation, the in-vehicle controller is further configured to: when the vehicle control instruction satisfies a preset condition, ignore the vehicle control instruction, where the preset condition includes at least one of a speed limit, a direction limit, a distance limit, or an instruction limit of the vehicle.

In a sixth feasible implementation, the in-vehicle controller is further configured to: output warning information after ignoring the vehicle control instruction, where the warning information is used to warn at least one of a controller that sends the first instruction or a controller that sends the second instruction.

In a seventh feasible implementation, the in-vehicle controller is further configured to: when the vehicle cannot execute the first instruction, determine the second instruction as the vehicle control instruction; or when the vehicle can execute neither the first instruction nor the second instruction, perform emergency handling, where the emergency handling includes at least one of parking, starting, speed changing, or direction changing.

In an eighth feasible implementation, any one of the at least two controllers includes: a human driver, an automated driving system, or an intelligent transportation system.

According to a fourth aspect, an embodiment of the present application discloses a control system for a vehicle, including an in-vehicle controller and an execution unit. The in-vehicle controller is configured to: receive a vehicle control instruction, and determine a function level to which a control function corresponding to the vehicle control instruction belongs; and determine, according to the function level to which the control function corresponding to the vehicle control instruction belongs and an instruction sending controller that sends the vehicle control instruction, whether the vehicle control instruction is valid. The execution unit is configured to: execute the vehicle control instruction when the in-vehicle controller determines that the vehicle control instruction is valid; or ignore the vehicle control instruction when the in-vehicle controller determines that the vehicle control instruction is invalid.

In a first feasible implementation, the function level to which the control function of the vehicle belongs includes: a negotiation level, a control level, and a limited level; and when determining, according to the function level to which the control function corresponding to the vehicle control instruction belongs and the instruction sending controller that sends the vehicle control instruction, whether the vehicle control instruction is valid, the in-vehicle controller is specifically configured to: if the control function corresponding to the vehicle control instruction belongs to the limited level, determine that the vehicle control instruction is invalid; or if the control function corresponding to the vehicle control instruction belongs to the control level, compare a priority of the instruction sending controller with a priority of a current vehicle controller, and if the priority of the instruction sending controller is higher than or equal to the priority of the current vehicle controller, determine that the vehicle control instruction is valid, or if the priority of the instruction sending controller is lower than the priority of the current vehicle controller, determine that the vehicle control instruction is invalid; or if the control function corresponding to the vehicle control instruction belongs to the negotiation level, compare a priority of the instruction sending controller with a priority of a current vehicle controller, and if the priority of the instruction sending controller is higher than or equal to the priority of the current vehicle controller, determine that the vehicle control instruction is valid and is used as a primary control instruction, so that the in-vehicle controller controls the vehicle according to the primary control instruction with reference to another secondary control instruction, or if the priority of the instruction sending controller is lower than the priority of the current vehicle controller, determine that the vehicle control instruction is valid and is used as a secondary control instruction, so that the in-vehicle controller controls the vehicle according to a primary control instruction with reference to the secondary control instruction.

In a second feasible implementation, the in-vehicle controller is further configured to: when the current vehicle controller cannot control the vehicle, request, according to priorities, another vehicle controller to participate in vehicle control; when determining that the another vehicle controller can participate in vehicle control, determine that a vehicle control instruction sent by the another vehicle controller is valid; and when determining that no other vehicle controllers can participate in vehicle control, perform emergency handling, where the priority of the vehicle controller is determined according to a driving mode of the vehicle and the function level to which the control function corresponding to the vehicle control instruction belongs, and the driving mode includes automated driving and non-automated driving.

In a third feasible implementation, the in-vehicle controller is further configured to: if execution of the vehicle control instruction causes the vehicle to be in danger, determine that the vehicle control instruction is invalid.

In a fourth feasible implementation, the in-vehicle controller is further configured to: when the vehicle control instruction is invalid, output warning information, where the warning information is used to warn the instruction sending controller.

According to a fifth aspect, an embodiment of the present application discloses an in-vehicle controller. The in-vehicle controller uses the control method for a vehicle according to the first aspect, to control the vehicle.

According to a sixth aspect, an embodiment of the present application discloses an in-vehicle controller. The in-vehicle controller uses the control method for a vehicle according to the second aspect, to control the vehicle.

According to a seventh aspect, an embodiment of the present application discloses an in-vehicle control apparatus. The in-vehicle control apparatus includes a processor and a memory coupled to the processor. The memory is configured to store code and an instruction relationship. The processor is configured to execute the code, to complete the control method for a vehicle according to the first aspect.

According to an eighth aspect, an embodiment of the present application discloses an in-vehicle control apparatus. The in-vehicle control apparatus includes a processor and a memory coupled to the processor. The memory is configured to store code. The processor is configured to execute the code, to complete the control method for a vehicle according to the second aspect.

It should be understood that, the third to the eighth aspects and the respective related feasible implementations in the embodiments of the present application and the embodiments corresponding to the first and the second aspects and the respective feasible implementations have similar technical means and obtain same beneficial effects. Details are not described again.

BRIEF DESCRIPTION OF DRAWINGS

To describe the technical solutions in the embodiments of the present application more clearly, the following briefly describes the accompanying drawings required for describing the embodiments or the prior art. Apparently, a person of ordinary skill in the art may still derive other drawings from these accompanying drawings without creative efforts.

DESCRIPTION OF EMBODIMENTS

To make a person skilled in the art understand the technical solutions in the present application better, the following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
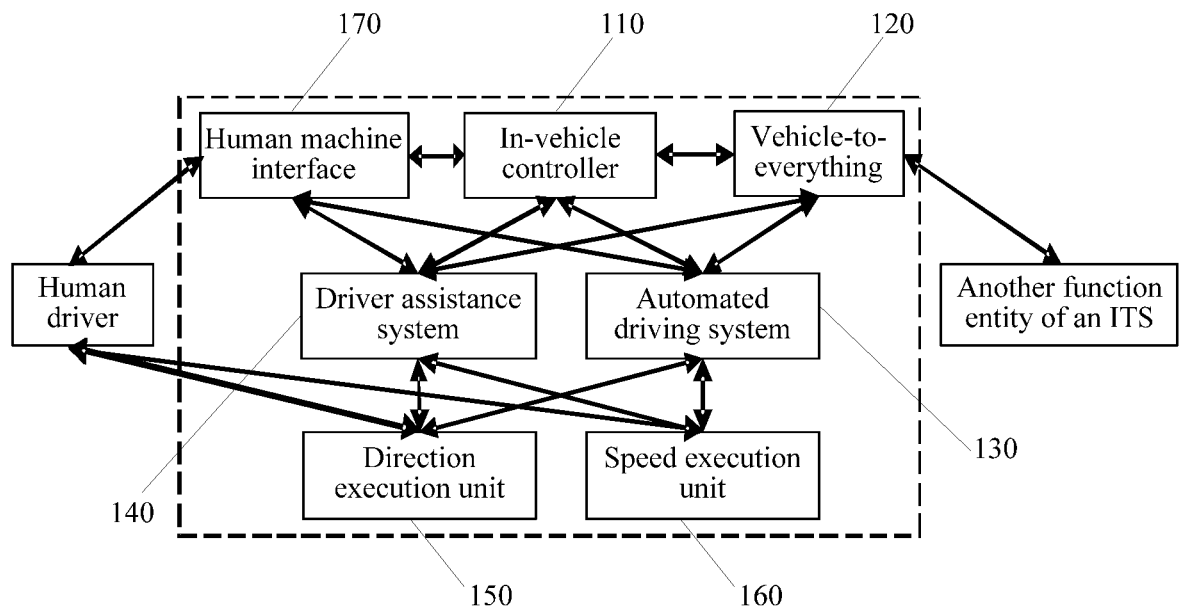
FIG. 1 is a schematic diagram of an architecture of a control system for a vehicle according to an embodiment of the present application.

Referring to FIG. 1, FIG. 1 is a schematic diagram of an architecture of a control system for a vehicle according to an embodiment of the present application. As shown in FIG. 1, the control system for a vehicle includes: an in-vehicle controller, for example, On-board Control Center (OCC) 110, a vehicle-to-everything (V2X) module 120, an automated driving system (ADS) 130, a driver assistance system (DAS) 140, a direction execution unit 150, a speed execution unit 160, and a human machine interface (HMI) 170.

The in-vehicle controller 110 is responsible for managing all control functions of the vehicle. The in-vehicle controller 110 interacts with a human driver or a passenger by using the human machine interface 170. The human machine interface 170 may include a physical button, a pressure touch panel, an audio-video collector, a display screen, a speaker, and the like.

The in-vehicle controller 110 interacts with another function entity in an ITS by using the vehicle-to-everything module 120. The V2X is a key technology in a future intelligent transportation system, and enables communication between vehicles, communication between a vehicle and a base station, and communication between base stations, so as to obtain traffic information such as a real-time road condition, road information, or pedestrian information, thereby improving driving security, reducing traffic jams, improving transportation efficiency, providing in-vehicle infotainment information, and the like.

When the vehicle is in a non-automated driving mode, the driver assistance system 140 may assist a human driver in controlling the direction execution unit 150 and the speed execution unit 160.

When the vehicle is in an automated driving mode, the automated driving system 130 controls the direction execution unit 150 and the speed execution unit 160.

The direction execution unit 150 is configured to execute a direction control instruction of the vehicle, to control a direction of the vehicle; and the speed execution unit 160 is configured to execute a speed control instruction of the vehicle, to control a speed of the vehicle.

Figure 2:
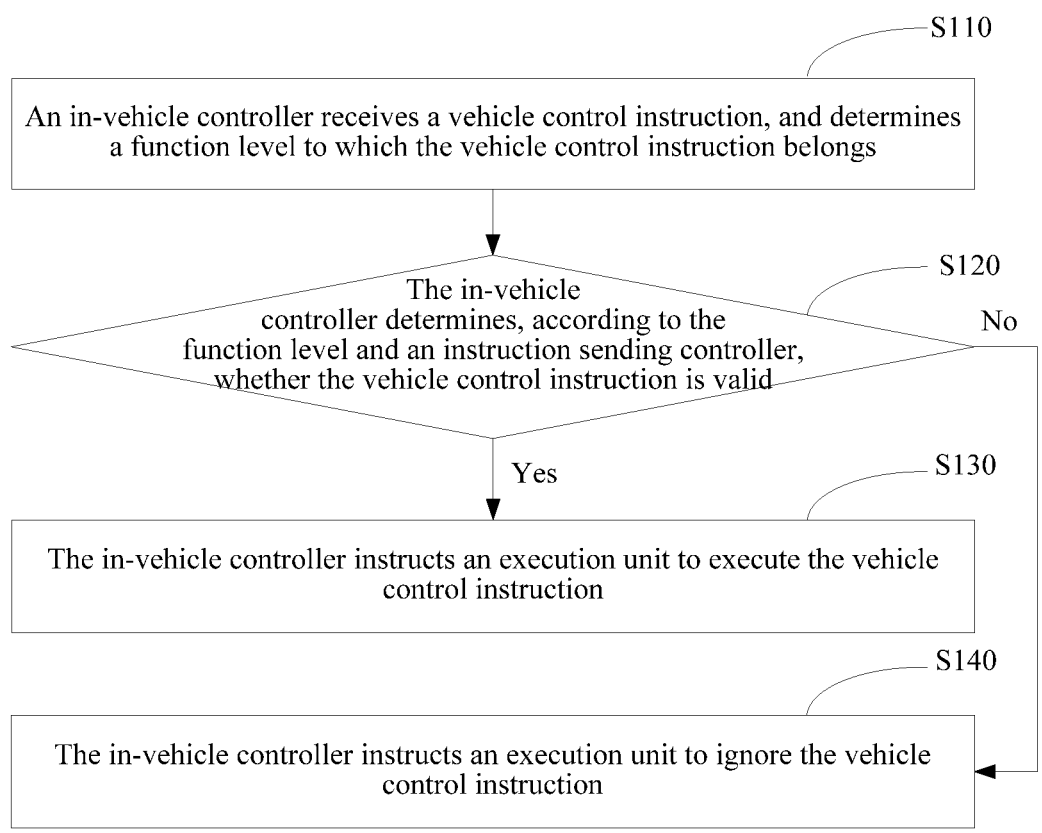
FIG. 2 is a schematic flowchart of a control method for a vehicle according to an embodiment of the present application.

Referring to FIG. 1 and FIG. 2, FIG. 2 is a schematic flowchart of a control method for a vehicle according to an embodiment of the present application. The method is applied to the control system for a vehicle shown in FIG. 1. As shown in FIG. 2, the control method for a vehicle may include the following steps.

S110. An in-vehicle controller receives a vehicle control instruction, and determines a function level to which a control function corresponding to the vehicle control instruction belongs.

Control functions of the vehicle are classified into different function levels according to flexibility of customizing the control functions and impact of the control functions on security of the control system for a vehicle.

Flexibility of customizing a control function is flexibility that different vehicle controllers are allowed to perform an operation. When more vehicle controllers are allowed to perform an operation, the flexibility of customizing the control function is higher. Flexibility of customizing a control function is related to impact of the control function on security of a vehicle system. For example, when a control function has relatively great impact on the security of the vehicle system, flexibility of customizing the control function is relatively low; or if a control function has relatively small impact on the security of the vehicle system, flexibility of customizing the control function is relatively high.

For example, the function levels may include: a negotiation level, a control level, a limited level, and the like.

A control function that can allow a non-current vehicle controller to participate in control belongs to the negotiation level. A controller with a higher priority may make a decision with reference to an opinion of a controller with a lower priority. Usually, a priority of controlling the function by each related vehicle control party may be flexibly changed as needed. For example, a driving path may be determined by an ITS with reference to traffic information learned by the ITS, and then the vehicle is instructed to travel according to the driving path. Alternatively, a driving path may be determined by a human driver (a user) according to a personal intention, and then the vehicle is instructed to travel according to the driving path.

A control function that allows only a current vehicle controller to perform control belongs to the control level. In a particular scenario, a priority of controlling the function by each possible controller is usually fixed. Usually, only a controller with a higher priority can control a control function at the control level, and a controller with a lower priority is not allowed to control the control function at the control level unless the vehicle cannot normally work in a current controller due to an accident. For example, direction control and speed control are performed by an ADS when the vehicle is in an automated driving mode, and direction control and speed control are performed by a human driver when the vehicle is in a non-automated driving mode. It should be noted that a priority of controlling the control function at the control level is related to a driving mode and a level of the control function. For example, for the control function at the control level, a priority of a controller corresponding to the current driving mode is higher than a priority of another vehicle controller. For example, in the automated driving mode, a priority of the ADS is higher than a priority of the human driver.

A control function that even does not allow the current vehicle controller to perform control belongs to the limited level. Control of the function is preset according to a specified rule. For example, a highest speed limit (which may be different in different scenarios) is preset for a vehicle speed of the vehicle before delivery, or the ITS instructs to set a highest speed limit (which may be different in different scenarios) when the ITS participates in an activity or a transaction. The vehicle is not allowed to exceed the speed limit regardless of a controller that controls the vehicle.

S120. The in-vehicle controller determines, according to the function level to which the control function corresponding to the vehicle control instruction belongs and an instruction sending controller that sends the vehicle control instruction, whether the vehicle control instruction is valid; and if determining that the vehicle control instruction is valid, the in-vehicle controller performs S130; or if determining that the vehicle control instruction is invalid, the in-vehicle controller performs S140.

The instruction sending controller may be a human driver or a non-human driver (such as, the ADS or the ITS).

For example, a function at the negotiation level may be determined by means of negotiation by each related control party. For a function at the control level, it is further determined, with reference to a priority of a vehicle controller, whether the vehicle control instruction sent by the instruction sending controller is valid. For a function at the limited level, no controller has control permission for the control function. That is, a vehicle control instruction corresponding to the function at the limited level is invalid.

S130. The in-vehicle controller instructs an execution unit to execute the vehicle control instruction.

S140. The in-vehicle controller instructs an execution unit to ignore the vehicle control instruction.

The execution unit in S130 and S140 includes the direction execution unit 150 and the speed execution unit 160 in FIG. 1.

According to the control method for a vehicle provided in this embodiment, vehicle control functions are classified in advance into different function levels. After receiving the vehicle control instruction, the in-vehicle controller obtains the function level to which the vehicle control instruction belongs, and then determines, according to the function level corresponding to the vehicle control instruction and the instruction sending controller, whether the vehicle control instruction is valid. If the vehicle control instruction is valid, the in-vehicle controller instructs the execution unit to execute the vehicle control instruction; or if the vehicle control instruction is invalid, the in-vehicle controller instructs the execution unit to ignore the vehicle control instruction. In the control method for a vehicle, the in-vehicle controller does not simply determine that the vehicle control instruction that is sent by the current vehicle controller corresponding to a current driving mode of the vehicle is valid. Instead, the in-vehicle controller determines, with reference to the function level to which the control function corresponding to the vehicle control instruction belongs and the instruction sending controller, whether the vehicle control instruction is valid, so as to coordinate vehicle control behaviors of an ITS, an ADS, and a human driver, thereby satisfying flexibility of vehicle control, that is, all vehicle controllers are possible to control the vehicle regardless of the current driving mode of the vehicle, and ensuring security of the control system for a vehicle.

Figure 3:
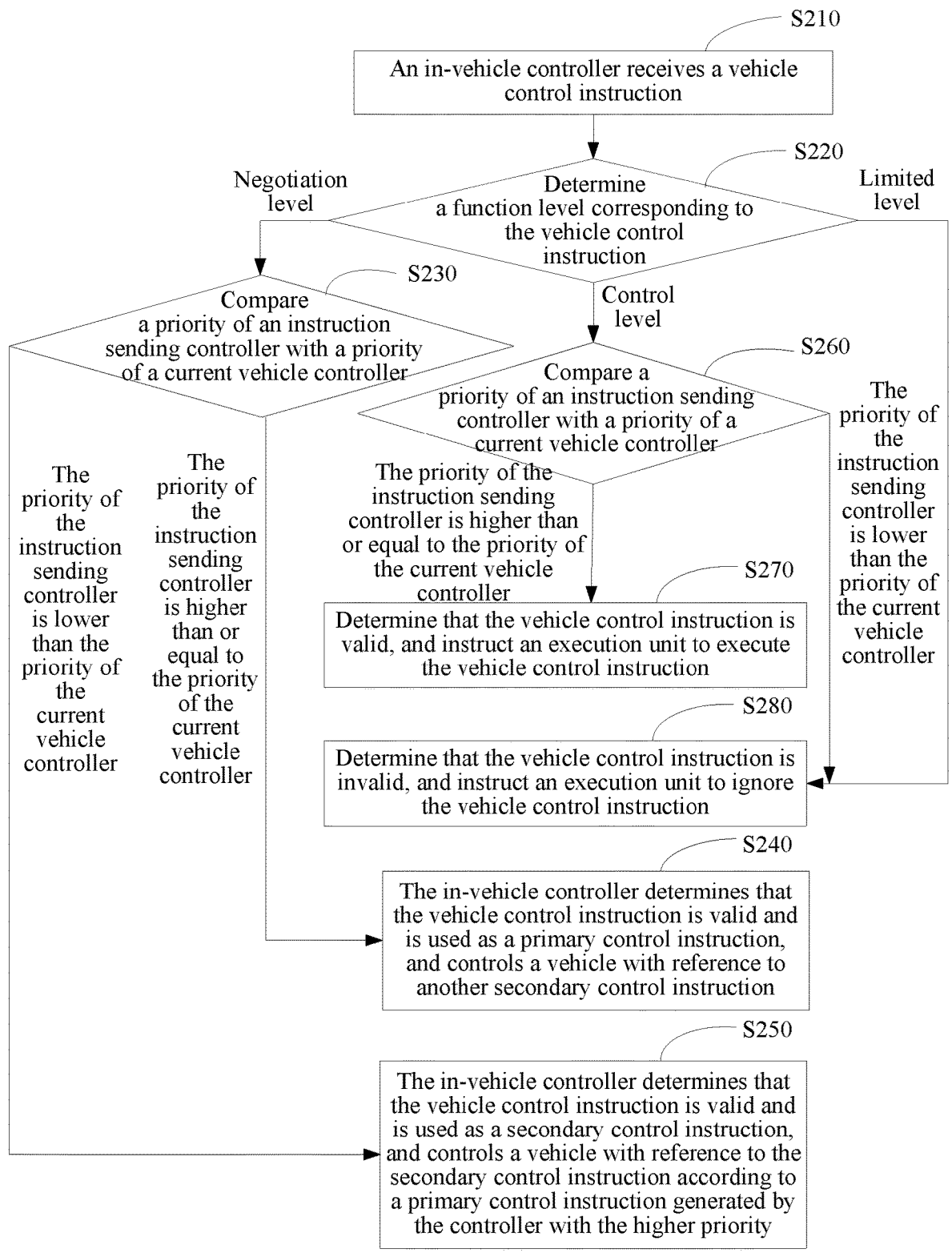
FIG. 3 is a schematic flowchart of another control method for a vehicle according to an embodiment of the present application.

Referring to FIG. 1 and FIG. 3, FIG. 3 is a schematic flowchart of another control method for a vehicle according to an embodiment of this application. A control function in this embodiment includes: a negotiation level, a control level, and a limited level. As shown in FIG. 3, the method includes the following steps.

S210. An in-vehicle controller receives a vehicle control instruction.

If the vehicle control instruction is initiated by a human driver, the human driver may send, to the in-vehicle controller, a corresponding vehicle control request by using a human machine interface.

S220. The in-vehicle controller determines a function level corresponding to the vehicle control instruction.

In some embodiments of the present application, the function level to which a control function belongs may include: a negotiation level, a control level, and a limited level. If the control function corresponding to the vehicle control instruction belongs to the negotiation level, S230 is performed; or if the control function corresponding to the vehicle control instruction belongs to the control level, S260 is performed; or if the control function corresponding to the vehicle control instruction belongs to the limited level, S280 is performed.

S230. The in-vehicle controller compares a priority of an instruction sending controller with a priority of a current vehicle controller, and if the priority of the instruction sending controller is higher than or equal to the priority of the current vehicle controller, performs S240, or if the priority of the instruction sending controller is lower than the priority of the current vehicle controller, performs S250.

Usually, a control function at the negotiation level may be determined by a controller with a higher priority with reference to an opinion of a controller with a lower priority. A priority of a vehicle controller is related to a level of the control function and the function level corresponding to the vehicle control instruction. For example, priorities of controlling path planning in descending order are sequentially: a user, an ITS, and an ADS.

For example, when the vehicle starts and is ready to move, the user (a human driver or a passenger) may send, to an in-vehicle controller 110, a path planning request by using a human machine interface 170, and provide destination information, waypoints, a possible preference, and other information (for example, highway is preferred). The in-vehicle controller 110 determines that path planning belongs to a function at the negotiation level, and therefore, may make a decision in combination with information and opinions of the user, the ADS, and the ITS.

S240. The in-vehicle controller determines that the vehicle control instruction is valid and is used as a primary control instruction, and controls the vehicle with reference to another secondary control instruction.

The in-vehicle controller 110 uses path planning formulated by the user, as the primary control instruction, and may make a final decision with reference to a path planned route formulated by the ITS or the ADS.

For example, the in-vehicle controller 110 requests the ITS for a path planning service by using a vehicle-to-everything module 120, and supplements a destination, the possible preference, and other information. After formulating path planning according to learned traffic information, the ITS feeds back the path planning to the in-vehicle controller 110 by using the vehicle-to-everything module 120. If no path planning service can be obtained from the ITS, the in-vehicle controller 110 may instruct a DAS or the ADS to formulate path planning according to map information configured by the vehicle. The in-vehicle controller 110 notifies, by using the human machine interface 170, the user of the path planning formulated by the ITS or the DAS/ADS. If a plurality of options that can completely satisfy a user requirement exist, or if no option completely satisfies a user requirement but alternative options that partially satisfy the user requirement are available, the user further needs to make a selection. The user may select one path as final path planning by using the human machine interface 170, and provide the final path planning to the in-vehicle controller 110. The in-vehicle controller 110 uses a path planning option finally selected by the user, as final path planning.

For another example, if the user wants to change a route during driving of the vehicle, the user may send a path planning update request to the in-vehicle controller by using the human machine interface 170, and provide an updated destination, updated waypoints, and other information. The in-vehicle controller 110 determines that path planning belongs to a function at the negotiation level, and obtains information about updated path planning by interacting with the ITS by using a vehicle-to-everything module 120, or instructs a DAS/the ADS to update the path planning according to map information configured by the vehicle. Then, the in-vehicle controller interacts, by using the human machine interface 170, with the user to confirm the updated path planning, and instructs the ADS to adjust a direction and a speed according to the confirmed new path planning.

S250. The in-vehicle controller determines that the vehicle control instruction is valid and is used as a secondary control instruction, and controls the vehicle with reference to the secondary control instruction according to a primary control instruction generated by the controller with the higher priority.

After receiving path planning formulated by the ITS or the ADS, the in-vehicle controller 110 determines that the path planning belongs to the secondary control instruction, uses path planning formulated by the user as the primary control instruction, and determines final path planning with reference to the secondary control instruction.

S260. The in-vehicle controller compares a priority of an instruction sending controller with a priority of a current vehicle controller, and if the priority of the instruction sending controller is higher than or equal to the priority of the current vehicle controller, performs S270, or if the priority of the instruction sending controller is lower than the priority of the current vehicle controller, performs S280.

The current vehicle controller is a controller corresponding to a current driving mode of the vehicle. If the vehicle is currently in an automated driving mode, the current vehicle controller is the ADS; or if the vehicle is currently in a non-automated driving mode, the current vehicle controller is the human driver.

A function at the control level allows only the current vehicle controller to perform an operation. In a particular scenario, a priority of controlling the function at the control level by each controller is usually fixed. A priority of controlling a control function at the control level is related to a driving mode and a level of the control function. For example, for the control function at the control level, a priority of a controller corresponding to the current driving mode is higher than a priority of another vehicle controller.

For example, if the in-vehicle controller 110 receives direction and speed operation instructions, the in-vehicle controller 110 determines that direction and speed operations belong to functions at the control level. The in-vehicle controller 110 continues to determine the current driving mode of the vehicle, and determines priorities of the instruction sending controller and the current vehicle controller for the control function at the control level according to the driving mode. For example, if the current driving mode is the automated driving mode, a priority of the ADS is higher than a priority of the human driver; or if the current driving mode is the non-automated driving mode, a priority of the human driver is higher than a priority of the ADS.

S270. The in-vehicle controller determines that the vehicle control instruction is valid, and instructs an execution unit to execute the vehicle control instruction.

When determining that the vehicle control instruction sent by the instruction sending controller is valid, the in-vehicle controller 110 instructs the execution unit (a direction execution unit 150 and a speed execution unit 160) to execute the vehicle control instruction.

S280. The in-vehicle controller determines that the vehicle control instruction is invalid, and instructs an execution unit to ignore the vehicle control instruction.

If the sent vehicle control instruction is invalid, the in-vehicle controller 110 instructs the execution unit to reject execution of the vehicle control instruction.

For example, when the vehicle is in the automated driving mode, if the user performs a direction operation or an acceleration operation by accident or performs an operation on a braking apparatus by accident, the in-vehicle controller 110 determines that direction and speed operations belong to functions at the control level, and the vehicle is currently in the automated driving mode. For control of a direction, a speed, or the braking apparatus, the priority of the ADS is higher than the priority of the human driver. Therefore, the in-vehicle controller 110 determines that a vehicle control instruction that is sent by the user (the human driver) for controlling the direction, the speed, or braking of the vehicle is invalid, and instructs the execution unit (the direction execution unit 150 and the speed execution unit 160) to ignore a user-related operation. Further, warning information may be sent by using the human machine interface 170, to prompt that the user is not authorized to perform speed and direction operations.

For another example, when the vehicle is in the non-automated driving mode, the human driver controls a direction and a speed of the vehicle. When the human driver performs an acceleration operation, the in-vehicle controller 110 determines that the speed operation belongs to a function at the control level. Therefore, a control priority of the human driver is higher than a priority of a non-human driver; and it is determined that an operation of controlling the speed of the vehicle by the human driver is valid, and the acceleration operation of the human driver is allowed. However, if the human driver makes an operation error, when over-acceleration may cause the vehicle to exceed a preset highest speed limit, the in-vehicle controller 110 determines that over-speed driving belongs to a limited function in a common use scenario of the vehicle. The preset highest speed limit is not allowed to be exceeded regardless of a controller that controls the vehicle. Therefore, an acceleration operation of the human driver is restricted, and warning information is output by using the human machine interface 170, to prompt the user that the vehicle may exceed the highest speed limit. If the human driver does not take any corrective action and causes the vehicle to finally reach the highest speed limit, the in-vehicle controller 110 instructs the execution unit (the speed execution unit 160) to ignore an acceleration control instruction of the human driver, so that it is ensured that the vehicle speed cannot exceed the highest speed limit.

Likewise, if the vehicle is in the automated driving mode, the ADS controls a direction and a speed of the vehicle. If an operation error occurs in the ADS (for example, the system encounters a failure or is broken into by a hacker), when over-acceleration may cause the vehicle to exceed a preset highest speed limit, the in-vehicle controller performs determining and processing similar to those performed when the human driver drives the vehicle. Details are not described herein.

Similarly, if the vehicle controller (the human driver or the ADS) incorrectly controls the direction of the vehicle or performs over-acceleration, causing the vehicle to collide with some objects, the in-vehicle controller 110 determines that a collision belongs to a function at the limited level in a common use scenario of the vehicle, and is prohibited regardless of a controller that controls the vehicle.

If the vehicle controller is the human driver, the in-vehicle controller 110 limits direction and speed operations of the human driver, and outputs warning information by using the human machine interface 170, to prompt the user that the vehicle may collide with an obstacle. If the human driver does not take any corrective action, the in-vehicle controller 110 instructs the speed execution unit to decelerate or stop the vehicle. If the human driver repeatedly makes the error, the in-vehicle controller 110 may instruct the direction execution unit and the speed execution unit to ignore direction and speed control of the human driver to ensure driving security of the vehicle. A process in a scenario in which the vehicle controller is the ADS is similar to the foregoing process, and details are not described herein.

According to the control method for a vehicle provided in this embodiment, control functions of the vehicle are classified into different function levels according to flexibility of customizing the control functions and impact of the control functions on security of a control system for a vehicle. For example, the function levels may include: the negotiation level, the control level, and the limited level. Then, it is determined, according to the level of the control function performed by the controller, whether the vehicle control instruction is valid. In the control method for a vehicle, the in-vehicle controller does not simply determine that the vehicle control instruction that is sent by the current vehicle controller corresponding to the current driving mode of the vehicle is valid. Instead, the in-vehicle controller determines, with reference to the function level to which the control function corresponding to the vehicle control instruction belongs and the instruction sending controller, whether the vehicle control instruction is valid, so as to coordinate vehicle control behaviors of the ITS, the ADS, and the human driver, thereby satisfying flexibility of vehicle control, that is, all vehicle controllers are possible to control the vehicle regardless of the current driving mode of the vehicle, and ensuring security of the control system for a vehicle.

Figure 4:
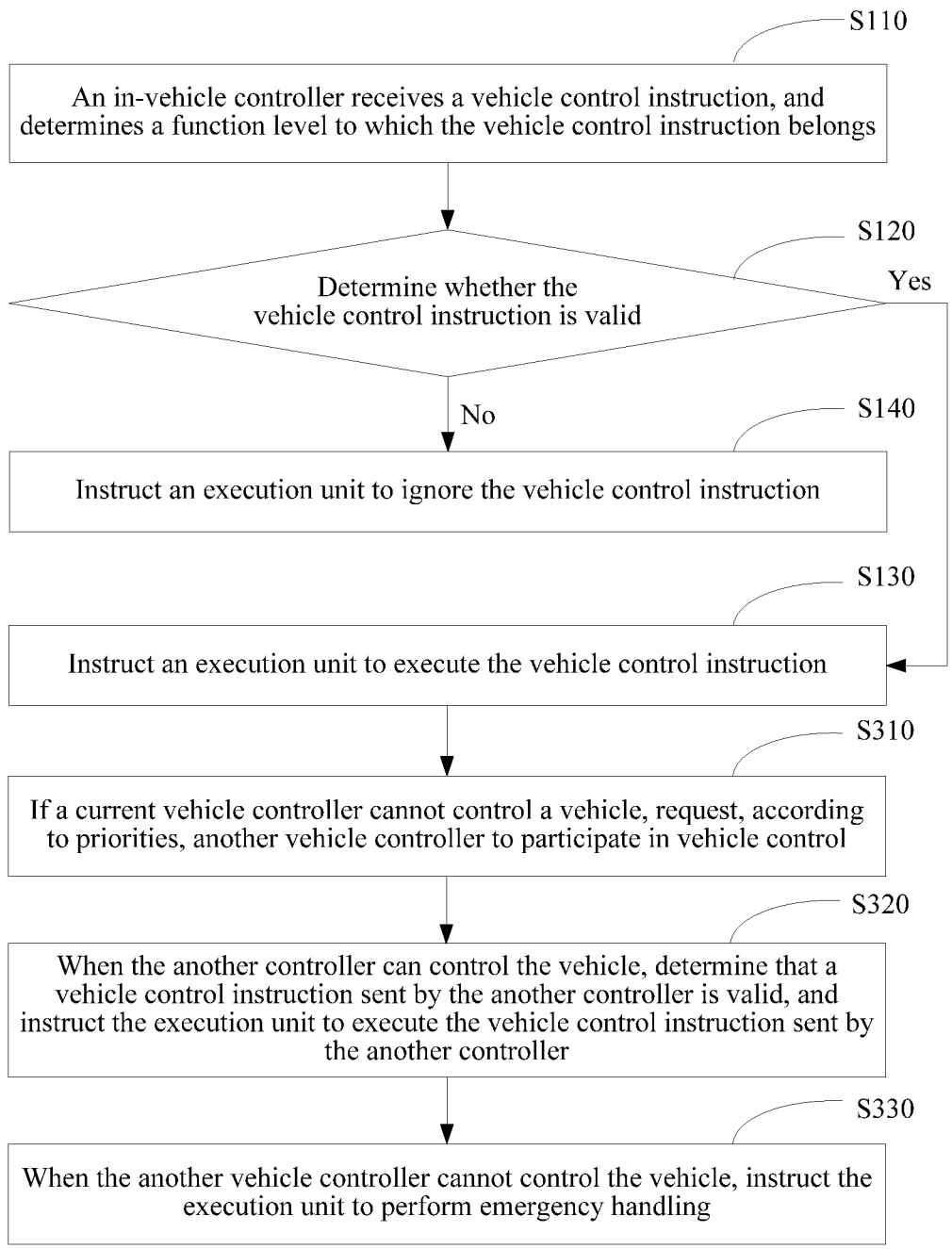
FIG. 4 is a schematic flowchart of still another control method for a vehicle according to an embodiment of the present application.

Referring to FIG. 4, FIG. 4 is a schematic flowchart of still another control method for a vehicle according to an embodiment of this application. Based on the embodiment shown in FIG. 2, the method further includes the following steps.

S310. When the current vehicle controller cannot control the vehicle, the in-vehicle controller requests, according to priorities, another vehicle controller to participate in vehicle control.

When the current vehicle controller is a human driver, the another vehicle controller is an ADS or an ITS; or when the current vehicle controller is an ADS, the another vehicle controller is a human driver or an ITS.

For example, the ADS has difficulty in controlling a direction and a speed of the vehicle for driving (such as a system failure or an information mismatch) according to already determined path planning, and the ADS reports the case to the in-vehicle controller 110 or the in-vehicle controller 110 learns the case by monitoring the ADS. Assuming that it is preset in such a manner that a priority of the human driver is higher than a priority of the ITS, the in-vehicle controller 110 requests, by using a human machine interface 170, a user with a higher priority to take over vehicle control. If the user cannot take over vehicle control, the in-vehicle controller 110 may continue to request the ITS to take over vehicle control.

S320. When determining that the another vehicle controller can control the vehicle, the in-vehicle controller determines that a vehicle control instruction sent by the another vehicle controller is valid, and instructs the execution unit to execute the vehicle control instruction sent by the another vehicle controller.

Still using the example in S310, if there is a human driver that can take over vehicle control, the human driver may return an accept response message to the in-vehicle controller by using the human machine interface 170, and the vehicle is switched to a non-automated driving mode. The in-vehicle controller 110 instructs the execution unit to execute a vehicle control instruction of the human driver, and the human driver controls the direction and the speed of the vehicle.

If the vehicle is in a non-automated driving mode, and the in-vehicle controller receives an accept response message of the ADS, an automated driving mode is switched to, and the execution unit is instructed to accept a vehicle control instruction sent by the ADS.

S330. When determining that the another vehicle controller cannot control the vehicle, the in-vehicle controller instructs the execution unit to perform emergency handling.

Still using the example in S310, in an application scenario, if no human driver can take over vehicle control (such as, no accept response message is received from the user within first preset duration, or a reject response message returned by the user is received), the in-vehicle controller 110 instructs the ADS to control the direction and the speed execution unit to perform emergency handling, for example, search for a secure place nearby for parking. In another application scenario, if no human driver can take over vehicle control, the in-vehicle controller 110 may continue to request the ITS to take over vehicle control, and if the ITS cannot take over vehicle control either, the in-vehicle controller 110 instructs the ADS to perform emergency handling.

If the vehicle is in the non-automated driving mode, the human driver frequently makes operation errors, and the ADS also encounters a failure and cannot control the vehicle, the in-vehicle controller 110 instructs the execution unit to take a security measure for emergency handling, to ensure driving security of the vehicle.

According to the control method for a vehicle provided in this embodiment, when the current vehicle controller cannot control the vehicle due to a failure, the in-vehicle controller requests, in descending order of the priorities, the another vehicle controller to intervene in vehicle control. If the another vehicle controller can take over vehicle control, the driving mode of the vehicle is switched, so that the another vehicle controller controls the vehicle. If the another vehicle controller cannot take over the vehicle, a security measure is taken for emergency handling, for example, deceleration is performed or a secure place nearby for parking is searched for, to fully ensure security of a control system for a vehicle.

Figure 5:
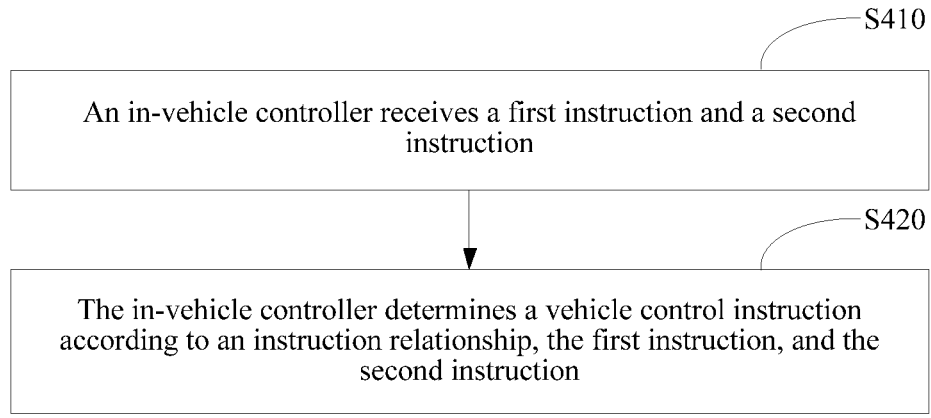
FIG. 5 is a schematic flowchart of another control method for a vehicle according to an embodiment of the present application.

Referring to FIG. 5, FIG. 5 is a schematic flowchart of another control method for a vehicle according to an embodiment of the present application. The method is applied to an in-vehicle controller, the in-vehicle controller pre-stores an instruction relationship, and the instruction relationship is used to represent an execution selection that is made by the in-vehicle controller from contrary instructions of at least two controllers. As shown in FIG. 5, the method includes the following steps.

S410. The in-vehicle controller receives a first instruction and a second instruction.

The first instruction is sent by a first controller, and the second instruction is sent by a second controller. The first controller and the second controller belong to different types of controllers. A vehicle controller includes a human driver, an automated driving system (ADS), and an intelligent transportation system (ITS). For example, the first controller is the human driver, and the second controller is the ADS or the ITS.

S420. The in-vehicle controller determines a vehicle control instruction according to the instruction relationship, the first instruction, and the second instruction.

The in-vehicle controller selects, according to the instruction relationship, at least one instruction from the first instruction and the second instruction as the vehicle control instruction for execution.

In some embodiments of the present application, the instruction relationship pre-stored in the in-vehicle controller may be determined according to priorities of controllers that send instructions. For example, the in-vehicle controller always chooses to execute an instruction sent by a controller with a higher priority.

For example, the priorities in descending order of the controllers that send instructions are sequentially the human driver, the ADS, and the ITS. If the controller that sends the first instruction is the human driver, and the controller that sends the second instruction is the ITS, the in-vehicle controller determines, according to the instruction relationship, the first instruction that is sent by the human driver with a higher priority, as the vehicle control instruction, and controls the vehicle according to the vehicle control instruction.

In some embodiments of the present application, when the first instruction and the second instruction are contrary, the in-vehicle controller determines the vehicle control instruction according to the execution selection that is made from the first instruction and the second instruction based on the instruction relationship.

That the first instruction and the second instruction are contrary includes: results that are generated by executing the first instruction and the second instruction conflict with each other. For example, the first instruction is controlling the vehicle to accelerate, but the second instruction is controlling the vehicle to decelerate.

In some other embodiments of the present application, when the first instruction and the second instruction are not contrary, the in-vehicle controller determines that the first instruction and the second instruction are both vehicle control instructions.

That the first instruction and the second instruction are not contrary includes: results that are obtained by executing the first instruction and the second instruction do not conflict with each other. For example, the first instruction is controlling the vehicle to accelerate, and the second instruction is also controlling the vehicle to accelerate; or the first instruction is determining a destination, and the second instruction is determining path planning for driving to the destination.

In some embodiments of the present application, if the in-vehicle controller cannot execute the first instruction, in this application scenario, the in-vehicle controller determines the second instruction as the vehicle control instruction.

For example, when the controller that sends the first instruction is the ADS, and the in-vehicle controller detects that the ADS has difficulty in controlling a direction and a speed of the vehicle for driving, a control instruction (the second instruction) sent by another vehicle controller is selected in descending order of priorities according to the foregoing priority relationship of the controllers for control instructions.

According to the control method for a vehicle provided in this embodiment, when instructions conflicting with each other that are sent from different controllers are received, it is determined, according to the instruction relationship pre-stored in the in-vehicle controller, which instruction is to be executed, so as to coordinate vehicle control behaviors of an ITS, an ADS, and a human driver, thereby ensuring security of a control system for a vehicle.

It should be understood that, for an illustration purpose, different instructions of only two controllers are used as an example in this embodiment of the present application, and according to an actual situation, there may be a plurality of different instructions of more than two controllers. This is not limited. In other embodiments, a quantity of controllers that send instructions is not limited either, and details are not described again.

Figure 6:
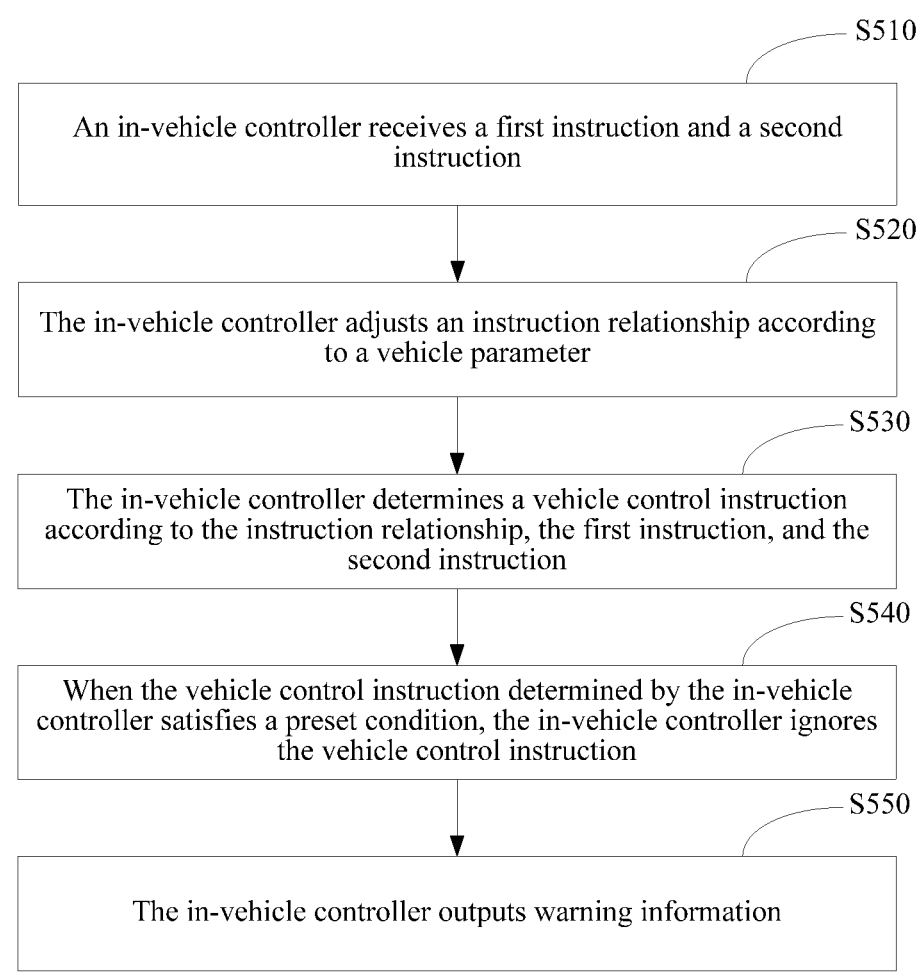
FIG. 6 is a schematic flowchart of another control method for a vehicle according to an embodiment of the present application.

Referring to FIG. 6, FIG. 6 is a schematic flowchart of yet another control method for a vehicle according an embodiment of the present application. The method may include the following steps.

S510. An in-vehicle controller receives a first instruction and a second instruction.

S520. The in-vehicle controller adjusts an instruction relationship according to a vehicle parameter.

The vehicle parameter includes at least one of a driving mode (an automated driving mode and a non-automated driving mode) of the vehicle, a running status, a maintenance status, or performance of the vehicle.

In the instruction relationship, when an instruction execution selection is determined according to priorities of instruction sending controllers, the priorities of the instruction sending controllers are adjusted according to the vehicle parameter, including dynamic adjustment and static adjustment.

The dynamic adjustment may be detecting, in a running process of the vehicle, that the vehicle parameter changes, and dynamically adjusting the priorities of the instruction sending controllers according to a change of the vehicle parameter, so that a vehicle control instruction is determined according to an adjusted instruction relationship. For example, when a vehicle status, a road condition, or the driving mode changes, the instruction relationship is adjusted in time according to a changed running status.

The static adjustment may be adjusting the instruction relationship according to a change of the vehicle parameter when it is detected, before the vehicle is started, that the vehicle parameter changes or the vehicle parameter is manually changed, and determining a vehicle control instruction according to the adjusted instruction relationship.

S530. The in-vehicle controller determines a vehicle control instruction according to the instruction relationship, the first instruction, and the second instruction.

S540. When the vehicle control instruction determined by the in-vehicle controller satisfies a preset condition, the in-vehicle controller ignores the vehicle control instruction, where the preset condition includes at least one of a speed limit, a direction limit, a distance limit, or an instruction limit.

The speed limit means that execution of the vehicle control instruction by the in-vehicle controller may cause the vehicle to exceed a specified highest speed. Therefore, the in-vehicle controller ignores the vehicle control instruction. The direction limit means that execution of the vehicle control instruction by the in-vehicle controller may cause the vehicle to violate a traffic rule or collide with an obstacle. Therefore, the in-vehicle controller ignores the vehicle control instruction The distance limit means that execution of the vehicle control instruction by the in-vehicle controller may cause the vehicle to collide with an obstacle. Therefore, the in-vehicle controller ignores the vehicle control instruction.

The instruction limit means that execution of the vehicle control instruction by the in-vehicle controller violates an operational provision of the vehicle. For example, a brake but not a clutch is directly stepped on during driving of the vehicle, and this case is not allowed to occur. Therefore, the in-vehicle controller directly ignores the vehicle control instruction.

The instruction limit further includes an instruction that is preset and that the vehicle is not allowed to execute personalized prohibited operations during driving of the vehicle, for example, it is not allowed to ignite a cigarette lighter or open a sunroof. The in-vehicle controller directly ignores the vehicle control instruction according to a user requirement.

S550. The in-vehicle controller outputs warning information.

The warning information is used to warn at least one (which is usually a sender of the determined vehicle control instruction) of a controller that sends the first instruction or a controller that sends the second instruction.

For related content of the warning information, refer to the related description in S280 in the embodiment corresponding to FIG. 3. Details are not described herein.

According to the control method for a vehicle provided in this embodiment, when instructions conflicting with each other that are sent from different controllers are received, it is determined, according to the instruction relationship pre-stored in the in-vehicle controller, which instruction is to be executed, so as to coordinate vehicle control behaviors of an ITS, an ADS, and a human driver. In addition, if it is determined that the vehicle control instruction satisfies the preset condition, the vehicle control instruction is ignored, to avoid a danger caused by execution of the vehicle control instruction to the vehicle, thereby improving security of a control system for a vehicle.

Corresponding to the embodiments of the control methods for a vehicle in FIG. 2 to FIG. 4, the present application further provides an embodiment of a control system for a vehicle.

Figure 7:
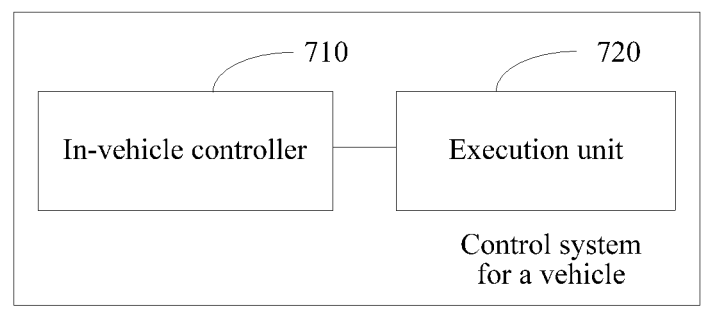
FIG. 7 is a block diagram of a control system for a vehicle according to an embodiment of the present application.

Referring to FIG. 7, FIG. 7 is a block diagram of a control system for a vehicle according to an embodiment of the present application. As shown in FIG. 7, the control system for a vehicle includes an in-vehicle controller 710 and an execution unit 720.

The in-vehicle controller 710 is configured to: receive a vehicle control instruction, and determine a function level to which a control function corresponding to the vehicle control instruction belongs; and determine, according to the function level to which the control function corresponding to the vehicle control instruction belongs and an instruction sending controller that sends the vehicle control instruction, whether the vehicle control instruction is valid.

In some embodiments of the present application, the function level to which the control function of the vehicle belongs includes: a negotiation level, a control level, and a limited level.

When determining, according to the function level to which the control function corresponding to the vehicle control instruction belongs and the instruction sending controller that sends the vehicle control instruction, whether the vehicle control instruction is valid, the in-vehicle controller 710 is specifically configured to:

if the control function corresponding to the vehicle control instruction belongs to the limited level, determine that the vehicle control instruction is invalid; or if the control function corresponding to the vehicle control instruction belongs to the control level, compare a priority of the instruction sending controller with a priority of a current vehicle controller, and if the priority of the instruction sending controller is higher than or equal to the priority of the current vehicle controller, determine that the vehicle control instruction is valid, or if the priority of the instruction sending controller is lower than the priority of the current vehicle controller, determine that the vehicle control instruction is invalid; or if the control function corresponding to the vehicle control instruction belongs to the negotiation level, compare a priority of the instruction sending controller with a priority of a current vehicle controller, and if the priority of the instruction sending controller is higher than or equal to the priority of the current vehicle controller, determine that the vehicle control instruction is valid and is used as a primary control instruction, so that the in-vehicle controller controls the vehicle according to the primary control instruction with reference to another secondary control instruction, or if the priority of the instruction sending controller is lower than the priority of the current vehicle controller, determine that the vehicle control instruction is valid and is used as a secondary control instruction, so that the in-vehicle controller controls the vehicle according to a primary control instruction with reference to the secondary control instruction.

The in-vehicle controller 710 is further configured to: when the current vehicle controller cannot control the vehicle, request, according to priorities, another vehicle controller to participate in vehicle control; when determining that the another vehicle controller can participate in vehicle control, determine that a vehicle control instruction sent by the another vehicle controller is valid; and when determining that no other vehicle controllers can participate in vehicle control, perform emergency handling, where the priority of the vehicle controller is determined according to a driving mode of the vehicle and the function level to which the control function corresponding to the vehicle control instruction belongs, and the driving mode includes automated driving and non-automated driving.

The in-vehicle controller 710 is further configured to: if execution of the vehicle control instruction causes the vehicle to be in danger, determine that the vehicle control instruction is invalid.

The in-vehicle controller 710 is further configured to: when the vehicle control instruction is invalid, output warning information, where the warning information is used to warn the instruction sending controller.

The execution unit 720 is configured to: execute the vehicle control instruction when the in-vehicle controller determines that the vehicle control instruction is valid; or ignore the vehicle control instruction when the in-vehicle controller determines that the vehicle control instruction is invalid.

According to the control system for a vehicle provided in this embodiment, control functions of the vehicle are classified into different function levels according to flexibility of customizing the control functions and impact of the control functions on security of the control system for a vehicle. For example, the function levels may include: the negotiation level, the control level, and the limited level. Then, it is determined, according to the level of the control function performed by the controller, whether the vehicle control instruction is valid. In the control system for a vehicle, the in-vehicle controller does not simply determine that the vehicle control instruction that is sent by the current vehicle controller corresponding to the current driving mode of the vehicle is valid. Instead, the in-vehicle controller determines, with reference to the function level to which the control function corresponding to the vehicle control instruction belongs and the instruction sending controller, whether the vehicle control instruction is valid, so as to coordinate vehicle control behaviors of an ITS, an ADS, and a human driver, thereby satisfying flexibility of vehicle control, that is, all vehicle controllers are possible to control the vehicle regardless of the current driving mode of the vehicle, and ensuring security of the control system for a vehicle.

Figure 8:
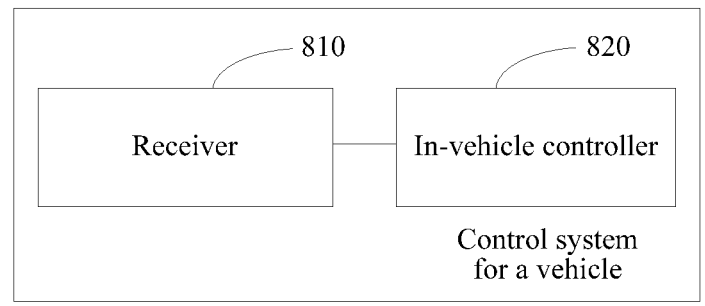
FIG. 8 is a block diagram of another control system for a vehicle according to an embodiment of the present application.

Referring to FIG. 8, FIG. 8 is a block diagram of another control system for a vehicle according to an embodiment of the present application. As shown in FIG. 8, the system includes a receiver 810 and an in-vehicle controller 820. The in-vehicle controller 820 pre-stores an instruction relationship, and the instruction relationship is used to represent an execution selection that is made by the in-vehicle controller from contrary instructions of at least two controllers.

The receiver 810 is configured to receive a first instruction and a second instruction.

The in-vehicle controller 820 is configured to determine a vehicle control instruction according to the instruction relationship, the first instruction, and the second instruction.

In some embodiments of the present application, when determining the vehicle control instruction according to the instruction relationship, the first instruction, and the second instruction, the in-vehicle controller 820 is specifically configured to: when the first instruction and the second instruction are contrary, determine the vehicle control instruction according to the execution selection that is made from the first instruction and the second instruction based on the instruction relationship.

In some other embodiments of the present application, when determining the vehicle control instruction according to the instruction relationship, the first instruction, and the second instruction, the in-vehicle controller 820 is specifically configured to: when the first instruction and the second instruction are not contrary, determine that the first instruction and the second instruction are both vehicle control instructions.

In some embodiments of the present application, the in-vehicle controller 820 is further configured to adjust the instruction relationship according to a vehicle parameter.

In some embodiments of the present application, the vehicle parameter includes at least one of a driving mode of the vehicle, a running status of the vehicle, a maintenance status of the vehicle, or performance of the vehicle.

In some other embodiments of the present application, the in-vehicle controller 820 is further configured to: when the vehicle control instruction satisfies a preset condition, ignore the vehicle control instruction, where the preset condition includes at least one of a speed limit, a direction limit, a distance limit, or an instruction limit of the vehicle.

In some other embodiments of the present application, the in-vehicle controller 820 is further configured to: output warning information after ignoring the vehicle control instruction, where the warning information is used to warn at least one of a sender that sends the first instruction or a sender that sends the second instruction.

In some other embodiments of the present application, the in-vehicle controller 820 is further configured to: when the first instruction cannot be executed, determine the second instruction as the vehicle control instruction; or when neither the first instruction nor the second instruction can be executed, perform emergency handling, where the emergency handling includes at least one of parking, starting, speed changing, or direction changing.

According to the control system for a vehicle provided in this embodiment, when instructions conflicting with each other that are sent from different controllers are received, it is determined, according to the instruction relationship prestored in the in-vehicle controller, which instruction is to be executed, so as to coordinate vehicle control behaviors of an ITS, an ADS, and a human driver, thereby ensuring security of the control system for a vehicle.

The embodiments in this specification are all described in a progressive manner, for same or similar parts in the embodiments, refer to these embodiments, and each embodiment focuses on a difference from other embodiments. Especially, apparatus or system embodiments are basically similar to a method embodiment, and therefore are described briefly; for related parts, refer to partial descriptions in the method embodiment. The described apparatus and system embodiments are merely examples. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present application without creative efforts.

The present application can be described in the general context of executable computer instructions executed by a computer, for example, a program module. Generally, the program unit includes a routine, program, object, component, data structure, and the like for executing a particular task or implementing a particular abstract data type. The present application may also be practiced in distributed computing environments in which tasks are performed by remote processing devices that are connected through a communications network. In a distributed computing environment, program modules may be located in both local and remote computer storage media including storage devices.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The foregoing descriptions are merely specific implementations of the present application. It should be noted that a person of ordinary skill in the art may make several improvements or polishing without departing from the principle of the present application and the improvements or polishing shall fall within the protection scope of the present application.

What is claimed is:

1. A method to control a vehicle implemented by an in-vehicle control apparatus comprising a processor and memory, wherein the method comprises:
   receiving a vehicle control instruction from a first vehicle control apparatus, wherein the vehicle control instruction corresponds to a control function of the vehicle;
   determining a function level of the control function;
   determining, using the function level of the control function and information about the first vehicle control apparatus, whether the vehicle control instruction is valid; and
   executing the vehicle control instruction to enable the first vehicle control apparatus to control the vehicle when the vehicle control instruction is valid.

2. The method of claim 1, wherein the function level of the control function is obtained through classification according to impact of the control function on security of a vehicle system and flexibility of customizing the control function.

3. The method of claim 1, wherein the function level of the control function comprises a negotiation level, a control level, and a limited level, wherein the method further comprises performing one of the following two options:
   (1) determining that the vehicle control instruction is invalid when the function level of the control function is a limited level; and
   performing the following two steps:
      (a) comparing a priority of the first vehicle control apparatus with a priority of a second vehicle control apparatus when the control function belongs to the control level; and
      (b) determining that the vehicle control instruction is valid when the priority of the first vehicle control apparatus is higher than or equal to the priority of the second vehicle control apparatus, or determining that the vehicle control instruction is invalid when the priority of the first vehicle control apparatus is lower than the priority of the second vehicle control apparatus; or
   (2) comparing a priority of the first vehicle control apparatus with a priority of a second vehicle control apparatus when the function level of the control function is a negotiation level; and
   performing the following two steps:
      (a) determining that the vehicle control instruction is valid and is used as a primary control instruction when the priority of the first vehicle control apparatus is higher than or equal to the priority of the second vehicle control apparatus, wherein the in-vehicle control apparatus controls the vehicle according to the primary control instruction with reference to another secondary control instruction; and
      (b) determining that the vehicle control instruction is valid and is used as a secondary control instruction when the priority of the first vehicle control apparatus is lower than the priority of the second vehicle control apparatus, wherein the in-vehicle control apparatus controls the vehicle according to a primary control instruction with reference to the secondary control instruction.

4. The method of claim 3, further comprising:
requesting, according to priorities of the first vehicle control apparatus and the second vehicle control apparatus, another vehicle control apparatus to participate in vehicle control when the second vehicle control apparatus cannot control the vehicle;
determining that a vehicle control instruction from the another vehicle control apparatus is valid when the another vehicle control apparatus participates in vehicle control; and
performing emergency handling when no other vehicle control apparatuses participate in vehicle control.

5. The method of claim 3, wherein the second vehicle control apparatus and the first vehicle control apparatus comprise a user controlled apparatus, an automated driving system, or an intelligent transportation system.

6. The method of claim 1, further comprising determining, that the vehicle control instruction is invalid when execution of the vehicle control instruction causes the vehicle to output warning information.

7. The method of claim 6, wherein the warning information warns the first vehicle control apparatus.

8. A method to control a vehicle including an in-vehicle control apparatus, and comprising:
pre-storing, by the in-vehicle control apparatus, an instruction relationship representing an execution selection of the in-vehicle control apparatus from contrary instructions of at least two controllers;
receiving, by the in-vehicle control apparatus, a first instruction from a first vehicle control apparatus, wherein the first instruction comprises a first control function;
receiving, by the in-vehicle control apparatus, a second instruction from a second vehicle control apparatus, wherein the second instruction comprises a second control function;
determining, by the in-vehicle control apparatus, using a first function level of the first control function and information about the first vehicle control apparatus, whether the first instruction is valid;
determining, by the in-vehicle control apparatus, using a second function level of the second control function and information about the second vehicle control apparatus, whether the second instruction is valid;
determining, by the in-vehicle control apparatus, a vehicle control instruction according to the instruction relationship, the first instruction, and the second instruction; and
executing, by the in-vehicle control apparatus, the vehicle control instruction to enable the first vehicle control apparatus or the second vehicle control apparatus to control the vehicle.

9. The method of claim 8, wherein determining, by the in-vehicle control apparatus, the vehicle control instruction according to the instruction relationship, the first instruction, and the second instruction comprises determining, by the in-vehicle control apparatus, the vehicle control instruction according to the execution selection when the first instruction and the second instruction are contrary.

10. The method of claim 8, wherein determining, by the in-vehicle control apparatus, the vehicle control instruction according to the instruction relationship, the first instruction, and the second instruction comprises determining, by the in-vehicle control apparatus, that the first instruction and the second instruction are both vehicle control instructions when the first instruction and the second instruction are not contrary.

11. The method of claim 8, further comprising adjusting, by the in-vehicle control apparatus, the instruction relationship according to a vehicle parameter of the vehicle.

12. The method of claim 11, wherein the vehicle parameter comprises at least one of a driving mode of the vehicle, a running status of the vehicle, a maintenance status of the vehicle, or performance of the vehicle.

13. The method of claim 8, wherein determining, by the in-vehicle control apparatus, the vehicle control instruction according to the instruction relationship, the first instruction, and the second instruction comprises ignoring, by the in-vehicle control apparatus, the vehicle control instruction when the vehicle control instruction satisfies a preset condition, wherein the preset condition comprises at least one of a speed limit, a direction limit, a distance limit, or an instruction limit of the vehicle.

14. The method of claim 13, wherein after ignoring, by the in-vehicle control apparatus, the vehicle control instruction, the method further comprises outputting, by the in-vehicle control apparatus, warning information, wherein the warning information is used to warns at least one of the first vehicle control apparatus or the second vehicle control apparatus.

15. The method of claim 8, wherein determining, by the in-vehicle control apparatus, a vehicle control instruction according to the instruction relationship, the first instruction, and the second instruction further comprises:
determining, by the in-vehicle control apparatus, the second instruction as the vehicle control instruction when the vehicle cannot execute the first instruction; or
performing, by the in-vehicle control apparatus, emergency handling when the vehicle cannot execute the first instruction or the second instruction, wherein the emergency handling comprises at least one of parking, starting, speed changing, or direction changing.

16. The method of claim 8, wherein any one of the first vehicle control apparatus and the second vehicle control apparatus comprises a user controlled apparatus, an automated driving system, or an intelligent transportation system.

17. An in vehicle control apparatus to control a vehicle, comprising:
a memory storing instructions; and
a processor coupled to the memory and configured to execute the instructions that cause the in vehicle control apparatus to:
receive a vehicle control instruction from a first vehicle control apparatus, and
determine a function level of the control function;
determine, using the function level of the control function and information about the first vehicle control apparatus, whether the vehicle control instruction is valid; and
execute the vehicle control instruction to enable the first vehicle control apparatus to control the vehicle when the vehicle control instruction is valid; or
ignore the vehicle control instruction when the vehicle control instruction is invalid.

18. The in vehicle control apparatus of claim 17, wherein the function level comprises a negotiation level, a control level, and a limited level, wherein the instructions further cause the in-vehicle control apparatus to perform on of the following two options:
(1) determine that the vehicle control instruction is invalid when the function level of the control function is a limited level; and
perform the following two steps:
  (a) compare a priority of the first vehicle control apparatus with a priority of a second vehicle control apparatus when the control function belongs to the control; and
  (b) determine that the vehicle control instruction is valid when the priority of the first vehicle control apparatus is higher than or equal to the priority of the second vehicle control apparatus, or determine that the vehicle control instruction is invalid when the priority of the first vehicle control apparatus is lower than the priority of the second vehicle control apparatus; or
(2) compare a priority of the first vehicle control apparatus with a priority of a second vehicle control apparatus when the function level of the control function is a negotiation level; and
performing the following two steps of:
  (a) determining the vehicle control instruction is valid and is used as a primary control instruction when the priority of the first vehicle control apparatus is higher than or equal to the priority of the second vehicle control apparatus, wherein the in-vehicle control apparatus controls the vehicle according to the primary control instruction with reference to another secondary control instruction; and
  (b) determining the vehicle control instruction is valid and is used as a secondary control instruction when the priority of the first vehicle control apparatus is lower than the priority of the second vehicle control apparatus, wherein the in-vehicle control apparatus controls the vehicle according to a primary control instruction with reference to the secondary control instruction.

19. The in-vehicle control apparatus of claim 18, wherein the instructions further cause the in-vehicle control apparatus to be configured to:
request, according to priorities of the in-vehicle control apparatus, another vehicle control apparatus to participate in vehicle control when the second vehicle control apparatus cannot control the vehicle;
determine that a vehicle control instruction sent by from the another vehicle control apparatus is valid when the another vehicle control apparatus participates in vehicle control; and
perform emergency handling when no other vehicle controllers can participate in vehicle control, wherein the priority priorities of the first vehicle control apparatus and the second vehicle control apparatus is determined according to a driving mode of the vehicle and the function level of the control function, and wherein the driving mode comprises automated driving and non-automated driving.

20. The in vehicle control apparatus of claim 17, wherein the instructions further cause the in-vehicle control apparatus to be configured to determine that the vehicle control instruction is invalid when execution of the vehicle control instruction causes the vehicle to output warning information.

* * * * *

UNITED STATES PATENT AND TRADEMARK OFFICE
CERTIFICATE OF CORRECTION

PATENT NO. : 10,994,743 B2  
APPLICATION NO. : 16/170793  
DATED : May 4, 2021  
INVENTOR(S) : Yangbo Lin Page 1 of 1

It is certified that error appears in the above-identified patent and that said Letters Patent is hereby corrected as shown below:

In the Claims

Claim 14, Column 24, Line 30: "information is used to warns at least" should read "information warns at least"

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*